June 2, 1942.    W. L. E. KEUFFEL    2,285,285
CLINOMETER
Filed Nov. 8, 1940
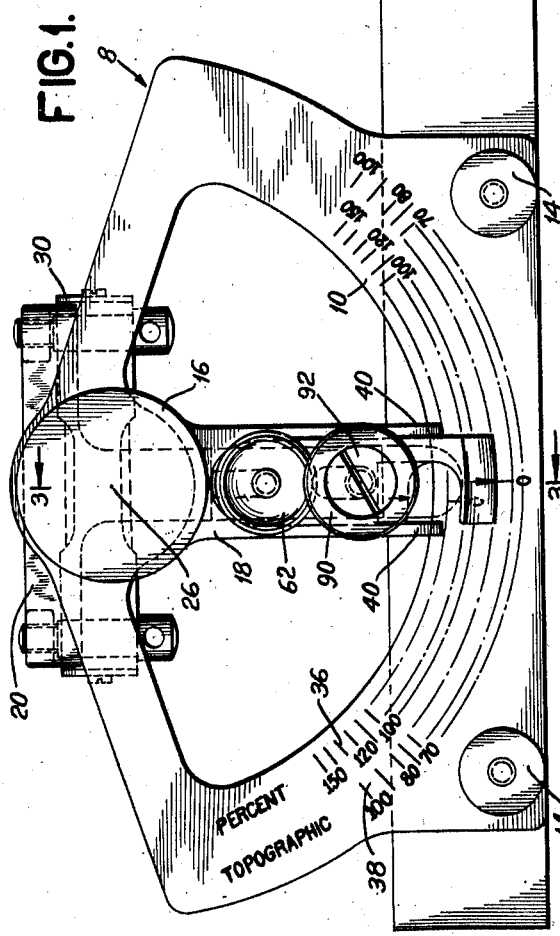
INVENTOR.
WILLIE L. E. KEUFFEL
BY Axton and Griswold
ATTORNEYS Patented June 2, 1942

2,285,285

UNITED STATES PATENT OFFICE 2,285,285

CLINOMETER

Willie L. E. Keuffel, Weehawken, N. J., assignor to Keuffel & Esser Company, Hoboken, N. J., a corporation of New Jersey Application November 8, 1940, Serial No. 364,783

13 Claims. (Cl. 116—124)

This invention relates to instruments of the kind adapted to measure inclinations in the determination of differences in elevation, such as clinometers of the type commonly known as "Abney levels," although not so limited. More particularly, the invention relates to graduated members or scales and the associated index members of such instruments by which the differences in elevation are indicated.

Instruments of this general type comprise a telescope tube having a horizontal reference line or sight wire which is used to sight objects, usually within a few hundred feet from the observer. A spirit level is simultaneously viewed when looking through the telescope, the spirit level being moved through an arc until it is horizontal. Means are provided for measuring the angle between the horizontal line determined by the level and the line of sight.

Abney levels are provided with an index arm, pivotable about the same axis as the spirit level. The end of the index arm traverses the surface of a graduated member customarily termed the "graduated limb." There are four usual types of graduated limbs; namely, "degree," in which the limb is graduated in angular units represented by one degree or one three hundred and sixtieth part of the circumference of a circle; "slope," in which the limb is graduated to indicate the ratio of units rise to units of horizontal distance; "percent of grade" in which the limb is graduated to indicate the ratio of one unit vertically to one hundred units horizontally; and "topographic" in which the limb is graduated to indicate the ratio of one unit vertically to sixty-six units, (i. e. the Gunter's chain) horizontally. Other graduations may also be used for certain forms of survey and include "chainage correction." These instruments are of very general utility in location surveys including preliminary and trial lines, center-line location, profile, cross-sections and topography and section line ties. They are useful for measuring the height of objects such as trees in forest surveys. Because of the general utility of these instruments and the relative simplicity of the steps involved in making surveys with them, they are frequently used by relatively inexperienced individuals. In normal use, surveys made with an Abney level require a measuring line which is frequently a chain of sixty-six foot length or multiples thereof preferably with a trailer or may be, as in the measurement of percent grade, one hundred feet. If an instrument is graduated in percent and the measuring line is graduated in chains, conversion of the readings taken is necessary.

Abney levels have heretofore been proposed provided with more than one scale on the graduated limb, with an index for each scale, but it was found that two adjacent scales, which were generally quite similar, caused confusion. When intending to read one scale, the observer oftentimes read the other, thereby making the results of the survey inaccurate. This difficulty was partly overcome by putting one set of graduations on one side of the graduated limb and another set of graduations on the other side of the limb. Because of the construction of the Abney levels, only the graduations on one side could be read. When it was desired to take readings on the other scale, the instrument had to be dismantled to reverse the graduated limb. This necessarily involved readjusting the instrument when it was again assembled. It frequently resulted in loss of essential parts of the instrument.

It is an object of this invention to dispose a plurality of scales on the same face of the graduated limb, while at the same time avoiding any confusion in taking the intended reading. According to this aspect of the invention, the index arm comprises a member having one reference point or index for each set of graduations on the graduated limb, but the indices are so disposed that when any one index is in position to indicate graduations of one scale, the other index or indices cannot be read with any scale. Thus, by a relatively simple adjustment on the index arm alone, the particular scale to be used can be readily and for all practical purposes permanently indicated, but if, at any time, it should be desired to use another scale, this can be readily accomplished by a simple adjustment.

Another object of the invention is to so relate an index member and a plurality of scales that the index member can be utilized in reading on only the selected scale graduations. Accordingly, each of a plurality of indices are limited to a related set of scale graduations and provision is made for rendering the other indices inoperative for the time being.

Another object of this invention is to provide an Abney level with at least two sets of graduations on a graduated limb and an index arm having indexing means or a vernier by which readings may be obtained from only one set of scale graduations for any particular setting of the instrument. To this end, there is provided a graduated limb having a plurality of sets of scale graduations and an index arm having an adjustable member carrying an index for each set of scale graduations and which adjustable member will permit the reading of only one set of graduations for any setting of the adjustable member. Conveniently, this is accomplished by removing an index from the related graduations or obscuring those graduations with the member which carries such index.

In one specific embodiment of the invention an Abney level is provided with a graduated limb having at least two sets of scale graduations. Such graduations may be in percent, slope, degree, topographic, chainage correction, or others. An index arm is provided having a radially adjustable portion carrying at least two indices so disposed that when one index is readable on one set of graduations, the other index is not operative with or readable on the other set of graduations, as, for instance, by so disposing some portion of adjustable means on the index arm that it obliterates or covers a section of one of the sets of graduations.

The invention also seeks a limb graduated with a plurality of scales and having an index member with related index points which is practical from the standpoint of accuracy in manufacture and the facility and accuracy in use.

These and other objects of the invention and the means for their attainment will be more apparent from the following detailed description, taken in connection with the accompanying drawing illustrating one embodiment by which the invention may be realized and in which:

Figure 1 is a view, in side elevation, of an Abney level showing the graduated limb and the index arm of this invention with one index adjusted to read on the related scale;

Figure 2 is a fragmentary view, in side elevation, showing the other index adjusted to read on its related scale, the thumb nuts being removed to show the adjustable index member;

Figure 3 is a view in transverse vertical section, taken in the plane indicated by the line 3—3 of Figure 1, and looking in the direction of the arrows;

Figure 4 is a view showing the index arm, the adjustable index carrying member and associated parts being removed to show details of construction; and Figure 5 is a transverse sectional view of the index arm and associated parts, taken in the plane indicated by the line 5—5 of Figure 3 and looking in the direction of the arrows.

Referring to the drawing, the frame member 8, of which the arcuate graduated limb 10 is a part, is mounted upon the sight tube or telescope 12. It is removably fixed thereto as by the screws 14. Pivotally mounted on the frame 8, as by the pivot member 16, is an index carrying arm indicated generally by the reference character 18. The axis of the pivot pin 16 passes through the center about which the arcuate scales are described. Carried by the index carrying arm 18, to move arcuately therewith, is the vial bracket 20. This bracket is carried by the vial bracket arm 22 which is disposed immediately beneath the index arm 18, preferably in the plane of the frame member 8, and is secured thereto by the index arm screw 24. In use, as will be understood, when the index arm 18 is free to move about its axis 26, the operator adjusts the position of the index carrying arm 18 until the point sighted coincides with the reference line or hairline 28 of the instrument and the image of the bubble of the level 30 (opposite the opening 32 in the wall of the tube 12) is simultaneously viewed by reflection in the mirror 34. The index carrying arm 18 is then clamped in position and the reading on one of the scales made. So much of the construction of the instrument and its operation is well known.

As shown in Figure 1, for purposes of illustration, the graduated limb 10 is provided with two sets of graduations, one of which, 36, is shown as a percent scale and the other of which, 38, is shown as a topographic scale.

The end of the index carrying arm 18 is bifurcated as at 40 and preferably the bifurcations 40 extend beyond the end 41 of arm 18 to overlie the arcuate portion 10 sufficiently to serve as one clamping member of a clamping device of which the index arm lock bar 42 is the other clamping member. As shown, the index arm lock bar 42 comprises a relatively stiff rectangular member, disposed beneath the index carrying arm 18 and whereof the outer end extends beneath the limb 10. Conveniently, the outer end of the lock bar 42 is substantially semi-circular in shape. The bifurcations are preferably not sufficient in length to obscure any part of a scale on the limb 8. The head of index arm screw 24 lies in an aperture in the index arm lock bar 42.

The index arm 18 is shown as formed in its upper surface with a longitudinally recessed portion or channel 44 of a width conveniently equal to the distance between the bifurcations 40. The channel 44 receives and guides a shiftable or adjustable index member 46 which reciprocates in the channel 44. The wall 48, at the inner extremity of the channel 44, controls or limits, in this instance, the position of the adjustable index member 46 at its innermost position. The side walls 50 of the channel 44 and, if desired, the bifurcations 40, guide the index member 46 in its movement. In the illustrated embodiment, the inner end wall of the channel is semi-circular as is also the inner end of the index member 46.

Instrumentalities are provided to control the relative position of the indices on the index member 46 with respect to the scales 36 and 38. At its inner end, the index member 46 is formed with an axially extending slot 52 which is shown as open at the inner end. This inner slot 52 is adapted to register with an aperture 54 in the index carrying arm 18 and also, for convenience, with an aperture 56 which is preferably threaded, in the arm 22 of the vial bracket 20. The index arm lock bar 42, disposed below the vial bracket arm 22 is also formed with an aperture 58 to register with the aforesaid apertures 54 and 56. An index member locking bolt 60 passes upwardly through the aperture 58 in the lock bar 42 and is threaded either in the aperture 56 in the vial bracket arm 22 or in the aperture 54 in the index carrying arm 18 or both so as to be positioned thereby. It also passes through the inner slot 52 in the adjustable index member 46 and extends thereabove. A thumb nut 62 on the index member bolt 60, when threaded downwardly on the bolt, is adapted to engage the upper surface of the index member 46 to frictionally retain that member in radially adjusted position with respect to the several scales.

To prevent confusion in reading the scales, that is; so that there is no possibility of a reading being taken from the wrong scale, provision is made to render the scale or scales or the index or indices not to be used inoperative. In the illustrated embodiment an index is provided for each scale but the indices are so located on the adjustable index member that only one index is capable of being used at a time. Furthermore, each index can be read only with its related scale. One side of the adjustable index member 46 is cut away, as at 70, forming a radially extending axially offset projecting portion 72 on the extremity of which is formed a transverse end portion 74. The inner side 76 of the cut away portion 70 is formed as a downwardly and outwardly inclined face or bevel on which is an index 78 which is so disposed as to cooperate with the scale 36. The transverse end portion 74 is also bevelled and is provided with the index 80 to coact with the scale 38. Obviously, instead of a single index point on the respective surfaces 74 and 76, each such surface may be provided with a vernier.

When a sight has been taken with the instrument, the index arm may be retained in position with respect to the limb by the clamping action of the bifurcations 40 and the index arm lock bar 42. To effect this clamping action a threaded locking member 82 is conveniently carried by the index arm lock bar 42. Member 82 passes through an aperture 84 in the vial bracket arm and through a registering aperture 86 in the bottom wall of the channel in arm 18. To permit relative movement between the adjustable index member 46 and the threaded member 82, the index member 46 is formed with an axially elongated aperture 88 through which the threaded locking member passes. To secure the index carrying arm 18 in the position to which it has been adjusted, a thumb nut 90, termed the index arm lock nut, is threaded downwardly on the threaded locking member 82 until it bears on the index member and thereby on the bottom of the channel so as to draw the index arm lock bar 42 upwardly and clamp the limb 10 between the bifurcations 40 and the end of the lock bar 42 and hold the index carrying arm fixedly in adjusted position. Obviously, even though no bifurcations 40 were provided to overlie the limb 10, the thumb nut may be caused to draw the index member 46 and the lock bar 42 together into clamping engagement with the limb. The first described form of clamping is preferred, however, since all possibility of wear tending to obliterate scale markings is avoided.

If desired, retaining means such as screw 92 may be threaded into the upper end of threaded member 82 to prevent the thumb nut 90 from being removed therefrom.

The use of the instrument of this invention is apparent from the foregoing description. Suffice it to say that when a reading is to be taken, both thumb nuts 62 and 90 are loosened and the index member 46 moved so that an index may be read with the desired scale. The adjustable index lock nut 62 is then tightened to hold the index member 46 in its so adjusted position. It will be observed that with the index member 46 in its outermost position, as shown in Figure 2, the end having the bevelled surface 74 and the index 80 has no observable relation with any graduation of scale 38, or in fact with any scale. Also the scale 38 is covered by the end 74 so that no graduations of the scale are visible at the index 80. When, however, adjustable index member 46 is in its innermost position, as shown in Figure 1, index 78 is completely removed from scale 36 and no readings can be made from that scale, but index 80 can be read with the graduations on scale 38. Then when the sight has been taken by moving the index carrying arm 18 until the bubble and line of sight coincide, the index carrying arm may be secured in adjusted position by tightening the locking nut, so that the exact relation of index to scale graduation is maintained during subsequent handling.

It will thus be seen that a compact useful measuring device has been provided in which a plurality of scales may be used and, from which scales, readings may be taken without confusion and without the necessity of dismantling and rearranging component elements, with the inherent necessity of adjustment incident thereto in shifting from one scale to another.

Various modifications will occur to those skilled in the art in the configuration and disposition of the component elements going to make up the instrument as a whole as well as in the number of scales and the instrumentalities availed of to insure the inoperativeness of all but one index at a time, or, conversely, the inoperativeness of all but one scale at a time so as to insure that the reading may be taken in the units of measure required for the problem at hand. No limitation is, therefore, intended by the phraseology of the foregoing description or illustrations in the accompanying drawing except as indicated in the appended claims.

What is claimed is:

1. In a measuring device, in combination, a limb, a plurality of scales depicted thereon, means movable simultaneously over said scales, a member adjustably carried by said means, indices carried by said member corresponding in number to the number of scales, said indices being so relatively disposed that at any indicating position of adjustmment of said index member only one of said indices will indicate a reading on any scale.

2. A graduated instrument having at least two adjacent scales, index carrying means in cooperative relation with said scales and an adjustable index member carried by said carrying means and provided with at least two indices so relatively disposed that at any indicating position of adjustment of said index member only one of said indices will indicate a reading on any scale.

3. A graduated instrument having at least two adjacent scales, index carrying means traversing said scales, means provided with an index for each scale and so adjustably carried by said index carrying means that for any given indicating position of said means only one of said scales can be read with any index.

4. A graduated instrument having at least two adjacent arcuate scales described about a common center, a pivoted arm traversing said scales, an index member carried by said arm and radially movable with respect to said scales, said index member being provided with at least two indices so disposed that for any indicating position of said index member only one of said indices will indicate a reading on any scale.

5. A graduated instrument comprising scale means and index means to coact therewith, said scale means being provided with at least two adjacent scales, said index means being provided with an index operable with each scale, said index means and said scale means being relatively movable, one of said means being capable of a second movement angularly related to the direction of the said relative movement whereby for any given indicating position of said index means only a predetermined scale can be utilized in taking a reading.

6. In a clinometer, in combination, a graduated limb provided with two adjacent arcuate scales, an index arm pivoted at the center about which said arcuate scales are described, an index member provided with two indices and carried by said arm and means to adjust the position of said index member on said index arm, said indices being spaced apart a radial distance greater than the radial distance between said scales whereby for a predetermined radial position of said index member only one index will give a reading on a scale.

7. A graduated instrument comprising a graduated limb having at least two adjacent scales, an index member in cooperative relation with said scales and having indices respectively related to the scales, said limb and index member being relatively movable, said indices being spaced apart a distance different from the distance between the scales whereby when one index is in position to give a reading on its related scale the other scale is obscured by the index member.

8. A clinometer comprising a graduated limb provided with a plurality of arcuate scales described about a common point, an index arm pivotally mounted to turn about said common point, an index member adjustably carried by the index arm and provided with indices only one of which is adapted to cooperate with any scale, for each indicating position of the index member and means to retain said index member in adjusted position.

9. A clinometer comprising a graduated limb provided with a plurality of arcuate scales described about a common point, an index arm pivotally mounted to turn about said common point, an axially movable adjustable index member carried by the index arm and whereof the end overlies the limb, said index member being provided with two radially spaced index faces and indices carried by the respective faces, said index faces being spaced apart a distance greater than the radial distance between the scales, and means to retain said index member in adjusted position, one of said index faces on the index member being so disposed as to be offset with respect to a scale when the other index face is in operative relation with another scale.

10. A clinometer comprising a graduated limb provided with a plurality of arcuate scales described about a common point, an index arm pivotally mounted to turn about said common point, the end of the arm overlying the graduated limb but being of a length less than the least radial distance of a scale, an axially movable adjustable index member carried by the arm and whereof the end overlies the limb, said index member being provided with a plurality of indices so disposed that only one index will give a reading on any scale for each indicating position of the index member, said index member being formed with at least one longitudinally extending elongated aperture, an index arm locking bar disposed beneath the index arm and extending beneath the limb, a threaded member secured to the index arm locking bar and passing through an aperture formed in the index arm and the elongated aperture formed in the index member and a thumb nut carried by the threaded member adapted to draw the arm and bar into clamping engagement with the limb.

11. A clinometer comprising a graduated limb provided with a plurality of arcuate scales described about a common point, an index arm pivotally mounted to turn about said common point, an axially movable adjustable index member carried by the arm and whereof the end overlies the limb, and means to secure the index member in adjusted position, said index member being cut away at one side proximate the end to define two radially spaced bevelled index faces, indices carried by the respective faces, said index faces being spaced apart a distance greater than the radial distance between the scales, one of said index faces on the index member being so disposed as to be offset with respect to one scale when the other index face is in operative relation with another scale.

12. A clinometer comprising a graduated limb provided with a plurality of arcuate scales described about a common point, an index arm pivotally mounted to turn about said common point, said index arm being formed with a longitudinally extending channel, an axially movable adjustable index member disposed in the channel and whereof the end overlies the limb, said index member being provided with radially spaced indices corresponding in number to the scales, said indices being spaced apart distances different from the radial spacing of the scales whereby only one index will give a reading on any scale at each indicating position of the index member, said index member being formed with a longitudinally extending elongated aperture, a bolt carried by the index arm and passing through the elongated aperture, and a thumb nut carried by the bolt to engage the adjustable index member to retain said member in adjusted position.

13. A graduated instrument having at least two adjacent scales, an index member in cooperative relation with said scales and having indices respectively related to the scales, said indices being spaced apart a distance different from the distance between the scales whereby only one index is in position to give a reading on a scale for each indicating position of the index member.

WILLIE L. E. KEUFFEL.